United States Patent
Kaen

(10) Patent No.: US 11,040,786 B2
(45) Date of Patent: Jun. 22, 2021

(54) EARTH OBSERVATION SATELLITE INFORMATION ROUTING SYSTEM

(71) Applicant: Cloud Constellation Corporation, Los Angeles, CA (US)

(72) Inventor: Hooshang Kaen, Los Angeles, CA (US)

(73) Assignee: CLOUD CONSTELLATION CORPORATION, Los Angeles, CA (US)

( * ) Notice: Subject to any disclaimer, the term of this patent is extended or adjusted under 35 U.S.C. 154(b) by 14 days.

(21) Appl. No.: 16/389,938

(22) Filed: Apr. 20, 2019

(65) Prior Publication Data

US 2020/0277087 A1     Sep. 3, 2020

Related U.S. Application Data

(63) Continuation of application No. PCT/US2019/022157, filed on Mar. 13, 2019.

(Continued)

(51) Int. Cl.
   *H04B 7/185*         (2006.01)
   *H04B 7/19*           (2006.01)
   (Continued)

(52) U.S. Cl.
   CPC ......... *B64G 1/1021* (2013.01); *B64G 1/1007* (2013.01); *B64G 1/1085* (2013.01);
   (Continued)

(58) Field of Classification Search
   CPC .............. H04B 7/1851; H04B 7/18513; H04B 7/18521; H04B 7/18515; H04B 7/18519;
   (Continued)

(56) References Cited

U.S. PATENT DOCUMENTS

| | | | | |
|---|---|---|---|---|
| 6,023,605 A | * | 2/2000 | Sasaki | H04B 7/195 455/12.1 |
| 6,400,926 B1 | * | 6/2002 | Dent | H04B 7/1851 455/13.1 |

(Continued)

*Primary Examiner* — Philip Sobutka
(74) *Attorney, Agent, or Firm* — West Coast IP, P.C.; Matthew D. Bottomly

(57) ABSTRACT

The focus of the present disclosure relates to a constellation of earth-observation satellites communicating with terrestrial access points through an intermediate satellite constellation of networked relay satellites. The network system includes one or more terrestrial access points, one or more earth observation satellites, and a satellite constellation including a plurality of communicatively coupled relay satellites. The earth observation satellites establish links with the relay satellites, which relay the communications from the earth observation satellites to the terrestrial access points. The earth observation satellite can transfer recorded information to one or more of the plurality of relay satellites. The communication from the earth observation satellite may be routed through multiple relay satellite in the network system to reach the terrestrial access point. Rather than transferring information from an earth observation satellite only when the earth observation satellite passes over the terrestrial access point, the network disclosed enables earth observation satellites to transfer information through the intermediate satellite constellation quickly and securely from nearly anywhere along its orbit around the Earth. Because the Earth observation satellite can route recorded information through the plurality of satellites in the intermediate satellite constellation to a terrestrial access point, instead of only when the earth observation satellite travels within range of a single terrestrial access point, the disclosed network system significantly extends the data transfer window while reducing monitoring delays.

20 Claims, 4 Drawing Sheets

Related U.S. Application Data

(60) Provisional application No. 62/642,005, filed on Mar. 13, 2018.

(51) Int. Cl.
*H04W 40/00* (2009.01)
*B64G 1/10* (2006.01)
*H04B 7/195* (2006.01)
*B64G 1/24* (2006.01)

(52) U.S. Cl.
CPC ......... *B64G 1/242* (2013.01); *H04B 7/18521* (2013.01); *H04B 7/195* (2013.01)

(58) Field of Classification Search
CPC ......... H04B 7/195; H04B 7/19; H04W 40/00; B64G 1/1007; B64G 1/1021; B64G 1/1085; B64G 1/242; B64G 3/00
USPC .............................. 455/12.1, 13.1, 13.2, 13.3
See application file for complete search history.

(56) References Cited

U.S. PATENT DOCUMENTS

| | | | |
|---|---|---|---|
| 10,419,106 B1* | 9/2019 | Liu | H04B 7/18515 |
| 2002/0041328 A1* | 4/2002 | LeCompte | G01C 11/025 |
| | | | 348/144 |
| 2004/0157554 A1* | 8/2004 | Wesel | H04B 7/195 |
| | | | 455/12.1 |
| 2008/0155070 A1* | 6/2008 | El-Damhougy | G06F 15/177 |
| | | | 709/220 |
| 2014/0105100 A1* | 4/2014 | Tronc | H04B 7/18515 |
| | | | 370/321 |
| 2018/0220107 A1* | 8/2018 | Williams, Jr. | H04N 7/185 |

* cited by examiner

EARTH OBSERVATION SATELLITE INFORMATION ROUTING SYSTEM

INCORPORATION BY REFERENCE TO RELATED APPLICATIONS

This patent application is a continuation of PCT Application No. PCT/US19/22157 titled "EARTH OBSERVATION SATELLITE INFORMATION ROUTING SYSTEM" and filed Mar. 13, 2019, which claims priority to U.S. provisional Application No. 62/642,005, titled "EARTH OBSERVATION SATELLITE INFORMATION ROUTING SYSTEM" and filed Mar. 13, 2018. This patent application additionally incorporates by reference the following applications: U.S. patent application Ser. No. 15/225,826, titled "SPACE-BASED ELECTRONIC DATA STORAGE AND TRA7NSFER NETWORK SYSTEM" and filed Aug. 2, 2016, International Application No. PCT/US16/16467, titled "SPACE-BASED ELECTRONIC DATA STORAGE AND TRANSFER NETWORK SYSTEM" and filed Feb. 3, 2016, U.S. Provisional Application No. 62/111,600, titled "Sky-Cloud Autonomous Electronic Data Storage and Information Delivery Network System" and filed Feb. 3, 2015, and PCT/US16/30276, titled "INTERMEDIARY SATELLITE NETWORK FOR CROSS-STRAPPING AND LOCAL NETWORK DECONGESTION" and filed Apr. 28, 2017. Each of the above patents and patent applications is expressly incorporated by reference in its entirety.

BACKGROUND

Field of the Invention

This patent document relates generally to earth observation orbital satellites. This application relates more particularly to a signal routing system for routing information from earth observation orbital satellites to terrestrial ground stations through an intermediate constellation of satellites, thereby increasing the image transfer windows for communication of information captured by the earth observation satellite.

Description of the Related Art

Orbital satellites are a useful tool in observing, measuring, and recording both human and natural changes around the Earth. There are currently a number of earth observation satellites and satellite networks currently in orbit around the Earth, tasked with roles ranging from monitoring changes to our ecosystem to remotely gathering intelligence on other countries or corporations. Earth observation satellites are used by scientists and corporations to monitor natural variables including the oceans and ice sheets, the atmosphere, the weather (AURA, CALIPSO, CloudSat), soil and vegetation, and even the Earth's gravitational field and radiation absorption. Earth observation satellites are also used to monitor human behaviors such as infrastructure development, shipping, traffic, and military placement.

Satellite orbits are dictated by gravitational forces, which only enable stable, unpowered orbits along orbital planes that intersect the Earth's gravitational center. Satellite orbits can travel either circular or elliptical paths, and satellite orbits can be either geosynchronous or low/middle earth orbits. As a satellite travels through its orbit, the Earth will continue to rotate beneath the satellite. A satellite in geosynchronous orbit has the same orbital period as the Earth's rotation, and a satellite in geostationary orbit (geosynchronous orbit above the Earth's equator) will maintain a constant position relative to a region on the surface of the Earth.

Earth observation satellites in non-geosynchronous orbits pass over different regions of the Earth due to the differences between the Satellite's orbital period and the Earth's rotation as well as the angle between the orbital plane and the equatorial plane. A satellite in a low earth orbit will orbit the Earth a number of times during a single 24-hour period. A satellite in a polar orbit will orbit directly over the North and South poles on each orbit, but because the Earth continues to rotate while the satellite orbits, each orbital pass over the Earth may travel over a different region of the Earth. Although a polar orbit satellite will pass over a satellite dish on the North pole every orbit, it might only travel above a specific equatorial or non-polar satellite dish every $6^{th}$ or even $600^{th}$ orbit.

Placing an Earth observation satellite in a non-geostationary orbit, the satellite can monitor many different areas of the world with a single set of sensors; however, these satellites can only transfer information to the ground-based recipients when the satellite's orbit takes the satellite over and within range of an authorized and linked ground station. For example, a conventional Earth observation satellite monitoring ocean levels cannot alert its operators of a tidal wave or storm until the satellite passes within range of an associated ground station (rarely positioned in the middle of the Ocean), delaying the warning to residents. Similarly, operators of military or intelligence satellites may either prefer not to route or be incapable of securely routing sensitive information through potentially hostile neighboring territories.

If a small country is limited to only retrieve information from an intelligence satellite while the satellite traverses the sky over that small country, there is a very narrow window, and the satellite may only occasionally cross over the country every few orbits. This orbital relationship both limits the total amount of information transferred on each pass (limited by both communication bandwidth and communication time) and delays the receipt of potentially critical security information. Historically, these issues have been addressed by carefully selecting satellite orbits, increasing the number of satellites in orbit, by placing additional ground stations around the Earth (e.g., remote military bases), or by routing information received from satellites through non-controlled territories.

The inventors here have recognized that there are definite drawbacks that significantly impact the operational value of conventional Earth observation satellites. Accordingly, it is here recognized that a continued need exists to overcome and improve upon such shortcomings in such conventional Earth observation satellite communications.

SUMMARY

Therefore, there exists a continuing need for a new and improved solution (the Earth Observation Satellite Information Routing System) that can quickly, reliably, and securely transmit captured information from an Earth observation satellite to a ground station nearly anywhere in the world.

Various aspects are described in connection with an illustrative implementation of an Earth Observation Satellite Information Routing System facilitating the transfer of information from an Earth observation satellite in a polar low earth orbit through a space-based electronic network system (satellite cloud network) in an equatorial orbit disclosed herein. The various aspects are disclosed in the written specification including the drawings, and claims, and may be combined to form claims for a device, apparatus, system method of manufacture and/or use in any way, consistent with the teachings herein, without limitation.

The satellite cloud network comprises a plurality of uniquely configured and constructed network satellites positioned in a ring and maintaining constant communication between the satellites as they orbit the Earth. Each network satellite is configured to communicate with at least one satellite in each direction along the ring of network satellites (e.g., in a network ring comprising ten total network satellites, the third satellite would maintain communication with both the second and fourth satellites). Each network satellite is additionally configured to forward or mirror information received along the ring (e.g., in the preceding example, information communicated from the third satellite to the fourth satellite would be forwarded from the fourth satellite to the fifth satellite and so on). Additionally, some or all of the network satellites are capable of establishing external communication paths, such as with other satellites outside of the satellite cloud network access terminals on the ground, to either receive information from or transmit information to points outside of the satellite cloud network. In one embodiment, the network satellites circle the Earth in a low earth orbit (LEO) above the Earth's equator, and the network satellites only communicate indirectly with ground-based access terminals through geostationary (GEO) communications satellites. The system is configured so that an image captured by an Earth observation satellite is transmitted to a network satellite in the satellite cloud network, and that network satellite is capable of the image to any other network satellite, and then one or more of the network satellites either directly or indirectly transfers the image to an access terminal.

The access terminals may be positioned on the surface of the Earth and configured to communicate either directly with the network satellites or indirectly with the network satellites through communications satellites orbiting in a fixed geostationary ("GEO") orbit within range of the access terminal. In the indirect embodiment, the communications satellites may be configured to receive the communications from the access terminal and route those communications to one or more network satellites and to receive communications from one or more of the network satellites and route those communications to the access terminals.

In one aspect, the Earth Observation Satellite Information Routing System relies on existing communications satellites for intermediate communication routing. In another aspect, the system instead incorporates dedicated communications satellites and proprietary communications protocols between the access terminals and the network satellites. In still another aspect, the Earth Observation Satellite Information Routing System routes information received from the Earth Observation Satellite through the network satellites directly to a ground station or access terminal, bypassing geosynchronous communications satellites.

In one aspect, the network satellites occupy a single orbital plane (e.g. an equatorial orbital plane). In another aspect, the network satellites occupy more than one orbital plane. In a further aspect, the network satellites may orbit at a single orbital altitude (e.g., low-earth orbit). In a still further aspect, the network satellites may orbit at more than one altitude.

Various alternative implementations of the foregoing aspects are disclosed. The foregoing various aspects may be combined in any manner without limitation.

DETAILED DESCRIPTION OF THE EMBODIMENTS

Figure 1:
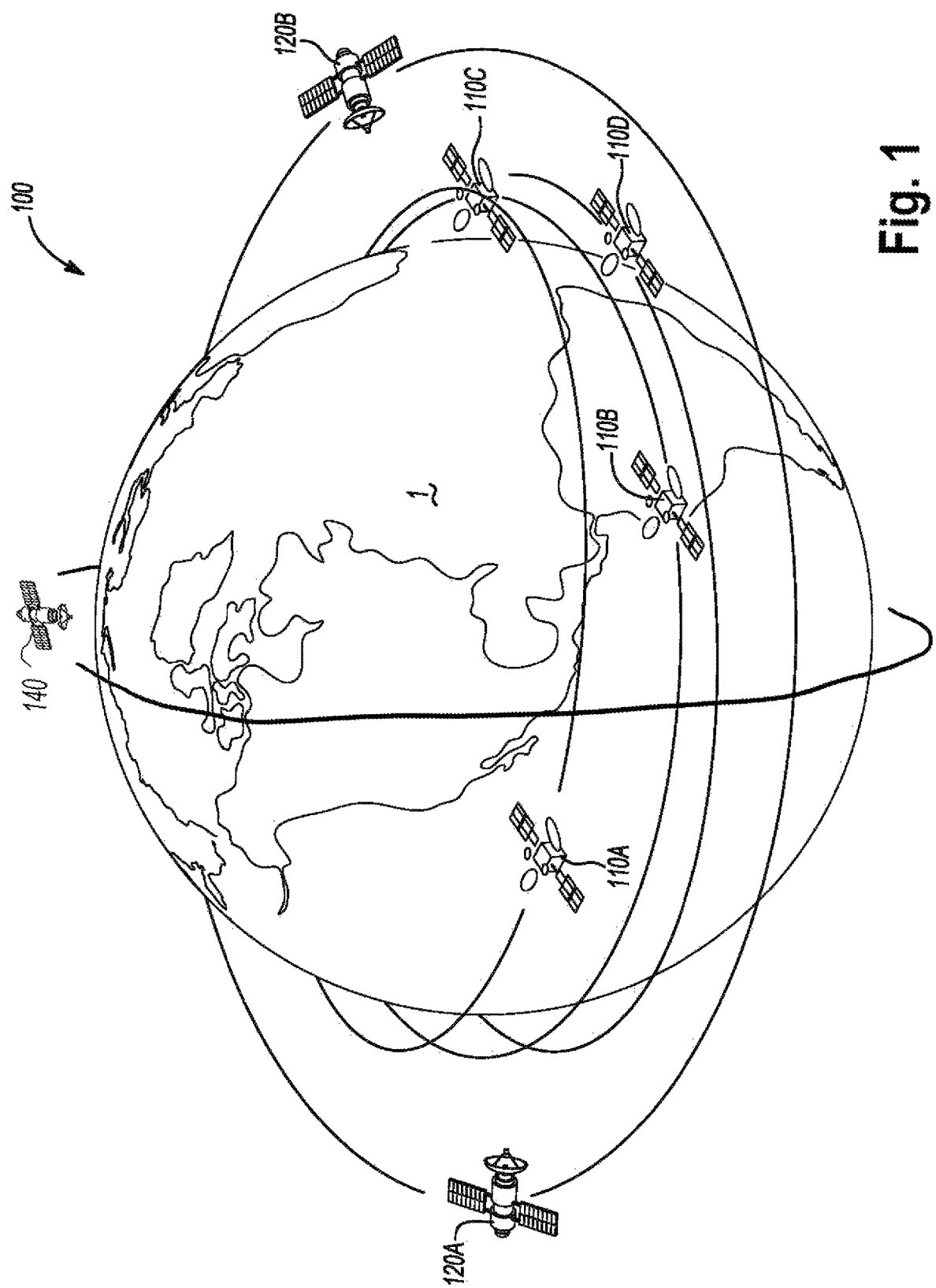
FIG. 1 is a representation of a first embodiment of an exemplary earth observation satellite information routing system in accordance with an embodiment of the present disclosure.

The features, aspects and advantages are described below with reference to the drawings, which are intended to illustrate but not to limit the invention. It should be understood, however, that the teachings herein are not limited to any particular satellite purpose and are applicable to satellites used for other purposes, in other orbits, and in other combinations.

The Earth Observation Satellite Information Routing System includes one or more Earth observation satellites 140, a satellite cloud network 100 comprised of a plurality of network satellites 110 orbiting a planet 1 (e.g., the Earth), and one or more terrestrial access points 130. The Earth Observation Satellite Information Routing System may further comprise geostationary communications satellites 120.

Each network satellite 110 may include a processor 201, a memory 202, a data storage element 203, a TT&C System 204, a power system 205 (including a battery 206 and power source 207), a communications array 209, sensors 210, and an input/output interface 211. A plurality of network satellites 110 occupy low-earth orbits ("LEO") and appear to traverse the sky as they rapidly orbit the planet 1, making them more difficult to track from a ground location. Each network satellite 110 communicates with other network satellites 110, creating a complete satellite network 100 orbiting the planet 1, for the purposes of improving uptime and accessibility of the Earth Observation Satellite Information Routing System.

Geostationary communications satellites 120 may include any or all of the same components as the network satellites 110 configured in the same or different configurations. Geostationary communications satellites 120 may additionally incorporate additional components, including additional sensors, shielding, or orbital adjustment means. Communications satellites 120 and network satellites 110 communicate with end-users and with each other via optical laser inter-satellite links (ISLs) and/or via any approved radio frequencies (e.g., X-band, Ku-Band, Ka-band, V-band, W-band, Q-band, C-Band, L-Band, S-Band, or any other ITU-recognized frequency) approved for use by the authorized United Nations governing body, the International Telecommunications Union (ITU). Other frequencies and communications protocols not approved by the ITU may also be incorporated.

Earth Observation satellites 140 may include any or all of the same components as the network satellites 110 configured in the same or different configurations. Earth Observation satellites 140 may additionally incorporate additional components, including cameras, additional sensors for monitoring the Earth or communications, shielding, or orbital adjustment means. A number of existing Earth observation satellites have been described herein, and the sensors and arrangements of each of the examples Earth observation satellite systems is expressly included within the meaning of Earth Observation satellite as used throughout this application, along with any combination of elements from a combination of the examples provided, or incorporating other obvious variations thereof.

Relay satellites 160 are a specific type of network satellite 110 that may include similar elements as other network satellites 110 and occupy the same (or alternate) orbital planes and altitude, but unlike network satellites 110 used for data storage, relay satellites 160 are not used to store data 10. Relay satellites 160 may include reduced data storage elements, capable of only temporary storage until that piece of data 10 can be transmitted to and stored on another network satellite 110 intended and configured to be used for data storage. Relay satellites 160 may be inserted into the satellite cloud network 100 to complete the network ring or to provide additional in-network bandwidth by providing multiple alternate communications paths for data 10.

As previously described, one major benefit of the Earth Observation Satellite Information Routing System disclosed herein includes expanding the retrieval area for recorded information from an Earth Observation Satellite 140 from its previously extremely limited direct satellite downlink footprint to now provide a nearly uninterrupted, nearly instantaneous, and global access. Connecting an Earth Observation Satellite 140 with a terrestrial Access Point 130 from any point during the Earth Observation Satellite's 140 polar orbit through the orbiting loop of network satellites 110 removes a number of limitations affecting modern Earth observation satellites, including global accessibility and the elimination of concerns from passing signals through neighboring countries. Additionally, the Earth Observation Satellite Information Routing System could include geographic limitations that restrict access to restricted data 10 only from within approved terrestrial jurisdictions, to eliminate any risk of hacking or data snooping. A user with an authorized terrestrial access terminal 130 can point his communications array (e.g., antenna, satellite dish, or laser inter-satellite link (ISLs)) toward the network satellite 110 (including communications satellites 120 included in the satellite cloud network 100) without relaying any information through any outside networks or nations. A terrestrial access terminal 130 transmitting via a properly focused beam of communication can send information to the intended satellite 110, eliminating the risk of interception. Similarly, a satellite (either network satellite 110 or communications satellite 120) transmitting via a properly focused beam of communication can send information to the intended terrestrial access point 130 without any risk of interception. Additionally, encryption, security keys, and properly recognizing approved geographic access terminals 130 eliminates the risk of digital intrusion.

In some embodiments, the Earth observation information is securely transmitted to end-users using a communications access terminal 130 to wirelessly communicate with a communications satellite 120 having service coverage over the relevant geographic region of the access terminal 130. As previously discussed, the satellite cloud network 100 is configured to be modularly expanded to incorporate additional network satellites 110 and to support additional end-users and access terminals 130 through future addition of communications satellites 120 and network satellites 110 into orbit. Each additional network satellite 110 further increases the communication window between the access terminal 130 and the Earth observation satellite 140.

The altitude or distance above a planet 1 determines the required velocity for any satellite to maintain a stable orbit, with the lowest altitude orbits requiring the highest velocities so that the satellite's kinetic energy balances the potential energy, preserving a stable orbit. The altitude or distance above the earth also determines the minimum number of network satellites 110 required to provide continuous communication between satellites 110, as the curvature of a planet 1 interferes with communication between distant network satellites 110 at lower orbital altitudes. The higher the orbital altitude for the network satellites 110, the fewer network satellites 110 are required to form a continuous communication network 100. Similarly, the higher the orbital altitude for the network satellites 110 and the Earth observation satellites 140 above the planet 1, the fewer satellites will be necessary to maintain an uninterrupted signal.

In a first embodiment of the Earth Observation Satellite Information Routing System, an access terminal 130A communicates directly with a geostationary orbiting communications satellite 120A that occupies a fixed apparent position in the sky relative to a fixed point on the ground. The communications satellite 120A establishes a communications link with a network satellite 110A within range, and through that first network satellite 110A, a link is formed with any or every other network satellite 110 through to Earth observation satellite 140. The Earth observation satellite 140 establishes a communications link with any network satellite 110X (e.g., 110A, 110B, 110C, etc.), which can be forwarded through any other network satellite to the end point at the access terminal 130A (via communications satellite 120). Instead of directly tracking and communicating with the Earth observation satellites 140 as they quickly traverse the sky during incredibly short communication windows, access terminal 130A establishes a communication link with communications satellite 120A, through which a link is established between access terminal 130A and the Earth observation satellite 140. If the Earth observation satellite 140 travels out of range of network satellite 110A or if the Earth observation satellite is capable of establishing a better communications link with another network satellite (e.g., network satellites 110B, 110C, 110D, 110E, 110F, 110G, or 110H), then the Earth observation satellite 140 will instead access the network satellites 110 through that other network satellite. Similarly, if network satellite 110A travels out of range of communications satellite 120A or if communications satellite 120A is capable of establishing a better communications link with another network satellite (e.g., network satellites 110B, 110C, 110D, 110E, 110F, 110G, or 110H), then communications satellite 120A accesses the network satellites 110 through that other network satellite. Communications satellite 120A and the Earth observation satellite 140 continue to swap which network satellite 110 is linked, providing continuous access to the Earth observation satellite 140 at any point during the Earth observation satellite's 140 orbit through continuous communication with the entire satellite cloud network 100.

In this embodiment of the Earth Observation Satellite Information Routing System, a plurality of network satellites 110A, 110B, 110C, 110D, 110E communicate wirelessly between each other and occupy a single equatorial orbital plane (ORB1) above the planet 1. An Earth observation satellite 140 is positioned in polar low earth orbit and wirelessly communicates with one, plural, or all network satellite(s) 110 within range instead of only communicating with one or more access terminals 130A, 130B on the surface of planet 1. The equatorial network satellites 110 greatly increase the communication window and significantly decrease the delay for transferring information from an Earth observation satellite 140 to a terrestrial access point 130.

Encrypted electronic data may be transmitted to/from access terminal 130A and/or 130B using at least one wireless signal from Earth observation satellite 140 through any available satellite 110A, 110B, 110C, 110D, 110E.

In an alternate embodiment of the Earth Observation Satellite Information Routing System, access terminal 130A bypasses communications satellite 120 and instead communicates directly with a network satellite 110A within range, and through that first network satellite 110A, a link is formed with other network satellites 110 as previously described, through to Earth observation satellite 140. The Earth observation satellite 140 establishes a communications link with any network satellite 110X (e.g., 110A, 110B, 110C, etc.), which can be forwarded through any other network satellite to the end point at the access terminal 130A (bypassing all communications satellites 120). This embodiment requires coordination and tracking between the Access terminals 130 and the network satellites 110, but otherwise functions similarly to the embodiment operating through communications satellites 120 without the additional infrastructure or additional hops.

In other embodiments, to improve the security and reliability of back-up data, the electronic data (Earth observation recordings or measurements) 10 is further transmitted among the communications satellites 110 along a secondary route of network satellites 110 to ensure rapid and guaranteed retrieval by the intended recipient(s).

In some embodiments, the satellite cloud network 100 may also authenticate the users associated with access terminals 130 prior to allowing the users of access terminals 130 to retrieve recorded information from the Earth observation satellites 140.

In some embodiments, the network 100 incorporates network architecture, devices, protocols, procedures, systems, encryption, multifactor authentication, anti-jamming and interference mitigation techniques, and wireless inter-satellite and ground links are utilized to distribute electronic data 10 to any other point in the satellite cloud network 100 and/or to any authorized end-user with access terminals 130 on or near planet 1. Additionally, in some embodiments, encryption, fast frequency hopping, narrow beam pointing, isolation, and optical laser transmission modulation may be employed to restrict unauthorized user or geographic intrusion.

In an alternate embodiment (not shown), multiple independent Earth Observation Satellite Information Routing Systems, each including their own satellite cloud networks may operate entirely independently from each other, each accessible from only a subset of terrestrial access terminals, and each having access to only a subset of Earth observation satellites. Certain enterprises such as branches of the military or an intelligence agency may desire private, dedicated, completely secure satellite cloud networks 100, immunizing retrieval of recorded Earth observation information from unauthorized access and insulated from cross-traffic.

In still other embodiments (not shown), a single Earth Observation Satellite Information Routing System built around a single satellite cloud network 100 may operate with multiple different Earth observation satellites 140. Although each Earth observation satellite 140 may only be accessible by a single, designated terrestrial access terminals 130, the information 10 may be encrypted at the Earth observation satellite and routed through the network satellites 110 without risk of data intrusion. In this system, many separate Earth observation systems may jointly benefit from the infrastructure of a single satellite cloud network 100.

Each network satellite 110 may include a power system 205, one or more communications arrays 209, one or more data storage elements 203, and a control system 212. The control system 212 comprises a processor 201 and a memory 202 (including both persistent and non-persistent memory). The power system 205 comprises a battery 206 and a power source 207.

Within the control system 212, one or more processors 201 may be connected to persistent and/or non-persistent memory 202 and control the operation of the network satellite 110, including the power system 205, the communications array 209, and the data storage elements 203. Multiple network satellites 110 can pool processing power to jointly manage computation for complicated processes. The processors 201 or the data storage elements 203 may include encryption and/or deduplication instructions to protect data and to optimize storage. Deduplication or compression may occur in network satellites 110, communications satellites 120, access terminals 130, or at any other computing device between the user and the eventual data storage element 203. The processors 201 may also include an authorization system to check credentials for an access terminal 130 and make certain that the access terminal 130 is authorized to send or retrieve data 1 prior to providing access to the data storage element 203.

Within the power system 205, one or more power sources 207 (e.g., a solar panel, thermal harvesting, atomic fusion, atomic fission, chemical decay, or a free electron gathering system) are electrically coupled to one or more batteries 206. A solar panel 207 can collect solar energy to power the network satellite 110 and charge the batteries 206. The batteries 206 provide back-up power when the network satellite 110 is shaded from the sun's rays by a planet or other body. In one aspect, the storage satellite 110 includes robotics and electronic instructions capable of opening and closing the solar panel 207 or directing the solar panel 207 toward or away from the source of light to increase or decrease the energy absorbed. It may be beneficial to increase energy absorption prior to entering or just after leaving the earth's shadow. It may additionally be beneficial to decrease energy absorption when the battery 206 is near full or the network satellite 110 needs to reduce thermal energy (temperature).

The communications array 209 may include a wireless communications system (e.g., laser inter-satellite link (ISL), microwave relay, or radio frequency transmission) configured to communicate with the other network satellites 110 (or with communications satellites 120 or access terminals 130). In one aspect, the communications array 209B of a first network satellite 110B is in constant communication with the communications arrays 209 of the leading network satellite 110A immediately in front and the trailing network satellite immediately behind 110C. The network satellites 110 create a continuous network 100, allowing any network satellite 110 to send data and instructions 10 to or retrieve data and instructions 10 from any other network satellite 110 in the network 100. In another aspect, each network satellite (e.g., 110B) is additionally capable of communicating with two or more network satellites ahead (e.g., 110A and 110H) and two or more network satellites behind (e.g., 110C and 110D) to improve network reliability and performance. If any satellite stops working, all remaining storage satellites remain in network communication by skipping over the non-functioning satellite 110. Alternatively, if any satellite 110 stops functioning, the network 100 can instead route data through the continuous loop in the opposite direction. Additional or redundant satellites 110 can also increase the flexibility and survivability of the network system 100.

In some embodiments, the network satellite 110 could include a position determining system, and a guidance or propulsion system so that the network satellite 110 can self-correct for orbital decay or adjust satellite spacing to optimize the failure, addition, or subtraction of other network satellites 110 into the satellite cloud network 100.

In some embodiments, navigation and fleet management of communications satellites 120 and network satellites 110 are performed by Telemetry, Tracking and Control ("TT&C") stations (not shown) placed on planet 1 where geographically desired. Network satellite 110 TT&C monitoring and requests can be transmitted directly from the ground to any network satellite 110 which can in turn relay the TT&C transmissions to any other network satellite 110 wirelessly connected to the satellite cloud network 100. The network 100 can also accept network satellite 110 TT&C transmissions indirectly via wireless links from the TT&C Stations to any communications satellite 120 to be wirelessly relayed to the intended network satellite 110 accordingly.

In some embodiments, the network satellites 110 includes radiation and thermal shielding and other structural and support elements to improve the performance, reliability, and survival of network satellite 110. In further embodiment, the beneficial support element comprises a shock-absorbing system to minimize the vibration or thrust effects of launching the network satellite 110 into orbit. In another embodiment, the beneficial structural element may include mirrored surfaces to minimize unwanted thermal absorption. In some embodiments, the network satellite 110 is configured and dimensioned with a heat management system to optimize heat absorption and dissipation in a vacuum. Solar exposure and electronic elements produce heat, even in a vacuum, and conduction and convection are nearly non-existent in the vacuum of space, so satellites must optimize thermal energy through manipulating the dispersal and radiative dissipation of thermal energy, and this heat management may include energy capture from heated elements, increased surface area (e.g. heat sinks) on some surfaces, and/or satellite rotation to avoid over-heating any side of the network satellite 110 due to prolonged solar exposure.

In satellite cloud networks 100 including data storage within the network satellites 110, the data storage hardware and operation may be as described in U.S. patent application Ser. No. 15/225,826, titled "SPACE-BASED ELECTRONIC DATA STORAGE AND TRA7NSFER NETWORK SYSTEM".

In some embodiments, the network satellites 110 may also include signal processors, digital processors, routers, controllers, software, switches, proximity detection, collision detection, temperature detection, and/or radiation detection to increase the security and survivability of the network satellite 110. In a further embodiment, a network satellite 110 may include a self-destruct and/or self-erase element, which may include an explosive, an electromagnetic pulse, a memory ejector, and/or a memory wipe element. A self-destruct and/or self-erase element may be activated if unauthorized access is detected or if a network satellite 110 experiences a significant collision, a decaying orbit, or is scheduled to be decommissioned.

As described previously, the construction of geostationary communications satellites 120, Earth observation satellites 140, or relay satellites 160 (and possibly even sub-orbital elements 150) may incorporate the same or similar elements and connections as the network satellites 110 described.

With reference to FIG. 1, Earth observation satellite 140 occupies a polar orbit. As the planet spins beneath the orbiting satellite, each orbital pass from pole to pole will pass over and observe a different stripe of the planet below. Network satellites 110A-D occupy 3 separate orbital planes, all of which are generally equatorial and exist between the Tropic of Capricorn and the Tropic of Cancer. When Earth observation satellite 140 is within range of a first network satellite 110A, first network satellite 110A is capable of and configured to receive transmissions from the Earth observation satellite 140 over Intersatellite Laser Link (ISL) or any other known long-range satellite-to-satellite communication. First network satellite 110A may then forward the transmission to another second network satellite 110C within the satellite cloud network 100. Second network satellite 110C s further configured to forward the transmission to geostationary communications satellite 120B, which then further forwards the transmission to a ground-based access terminal (not shown).

Figure 2:
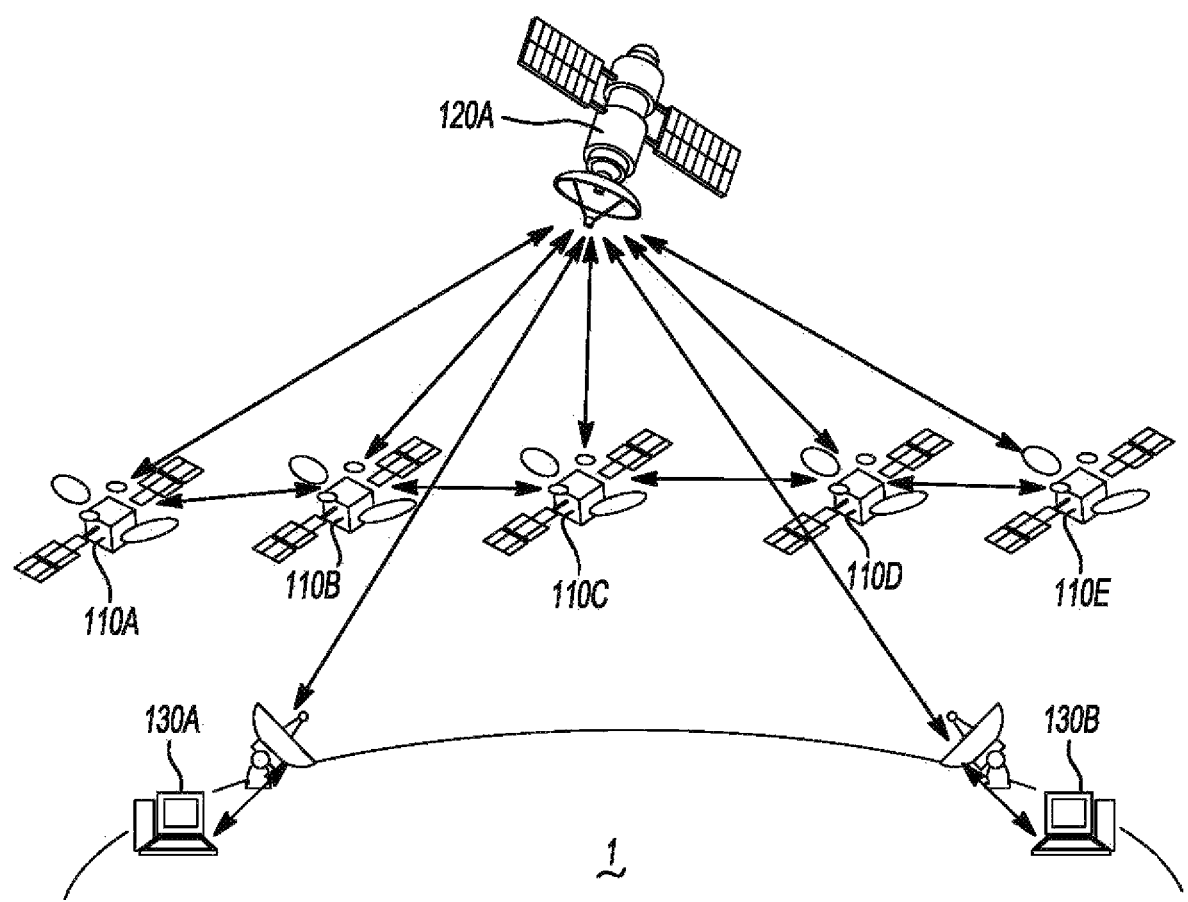
FIG. 2 is a representation of a first embodiment of a satellite cloud network in accordance with an embodiment of the present disclosure.

FIG. 2 simply depicts a version of the network satellites 110 within a satellite cloud network 100 interacting with terrestrial access terminals 130 through the geostationary communications satellites 120. No earth observation satellite 140 is depicted in FIG. 2.

Figure 3:
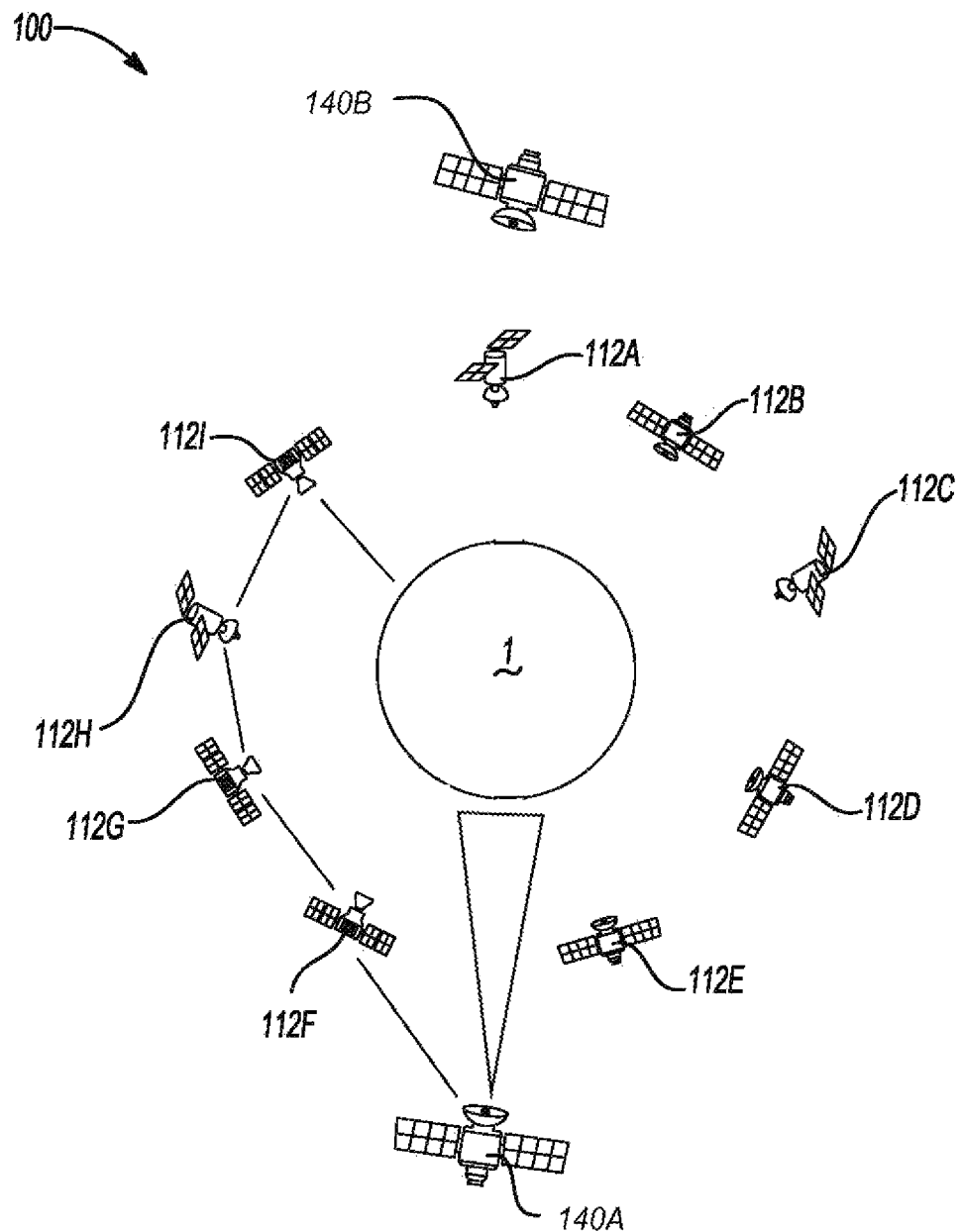
FIG. 3 is a schematic view of a first embodiment of an exemplary earth observation satellite information routing system in accordance with an embodiment of the present disclosure.
Figure 4:
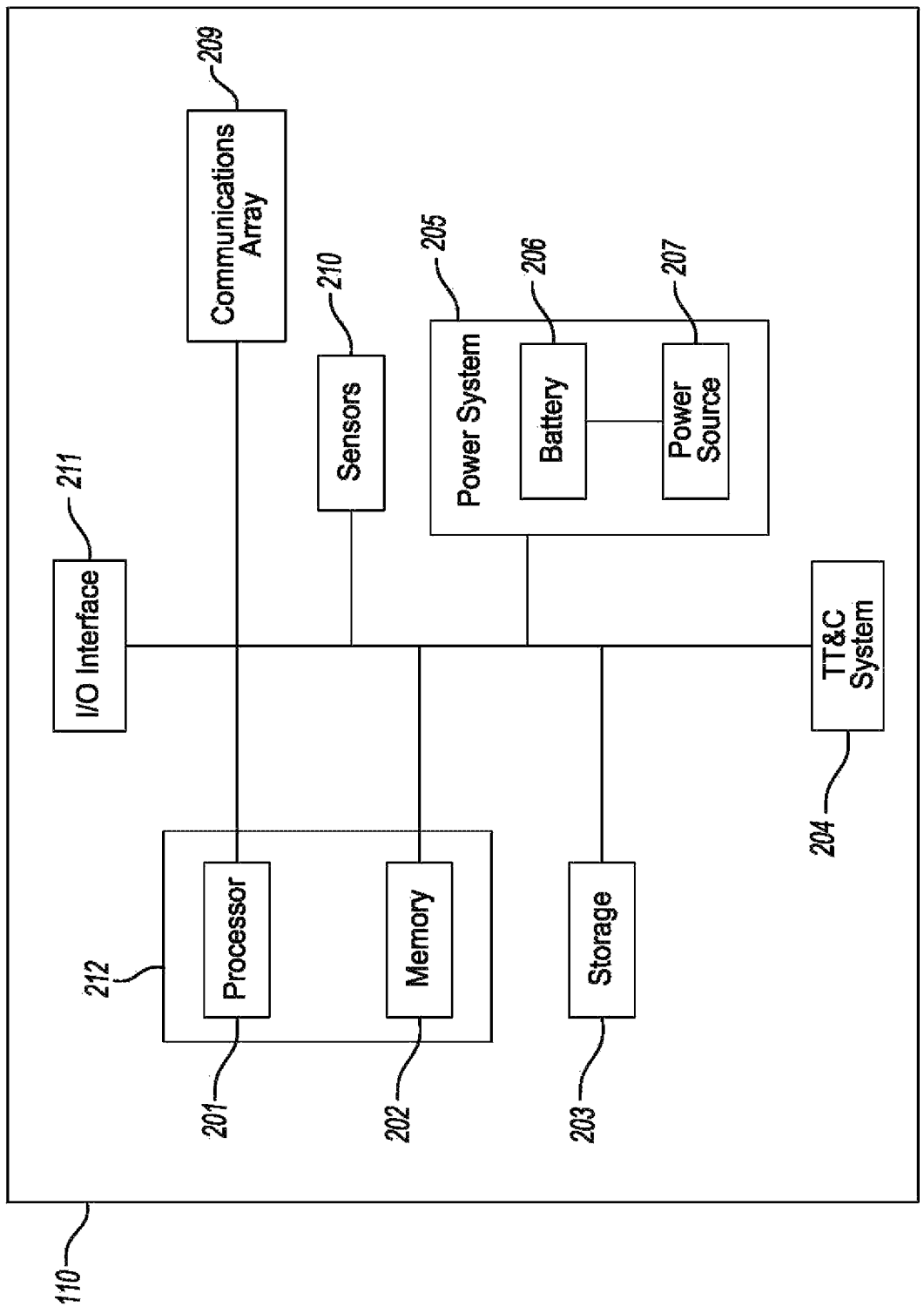
FIG. 4 is a block diagram of a computer system adaptable for use with one or more embodiments of the present disclosure.

With reference to FIG. 3, a simplified, flattened depiction of the earth observation satellite information routing system depicts network satellites 112A-112I forming a roughly equatorial orbital ring about the planet. Earth observation satellites 140A and 140B orbit the planet along a polar orbital path, travelling above the Arctic Circle and Antarctic Circle with every pass around the planet.

FIG. 3 further additionally simply depicts the communication path of the captured earth observation information 10 from earth observation satellite 140A through network satellites 112F, 112G, 112H, and 112I before being routed to a terrestrial access point 130 (not shown) on the planet's surface. In the present depiction, the network satellites 112 communicate directly with terrestrial access terminals without transmitting through 1 geostationary communications satellites 120 (not shown).

Through its communications array 209 of a network satellite 111 may also communicate with other network satellites or relay satellites 112 in alternate orbital planes or orbital radii. In one aspect, the communications array 209 can simultaneously send and retrieve data and instructions 10 with multiple communications satellites (e.g., 120A, 120B), and each communications satellites 120 can simultaneously send and retrieve data and instructions with the access terminals 130, thereby increasing the bandwidth of the network 100. In another embodiment, the communications array 209 on a network satellite 110 can send and retrieve data and instructions 10 directly with an access terminals 130.

In another embodiment, if an inter-satellite link system (in the communications array 209) in one network satellite (e.g., relay satellites 160, or storage satellites) 110 becomes totally disabled in directions required for communications with other network satellites 110, either the affected satellite 110 or the network 10 could generate instructions to entirely isolate or quarantine the affected satellite 110 from the network 10. In some cases, the isolated network satellite 110 may transmit its stored data 10 to one or more communications satellites 120, which will in turn transmit the data 10 to another non-isolated network satellite 10. This data rerouting may be temporary to provide temporary back-up routing during temporary communications interruptions. In some instances, all data 10 may be permanently transferred from an isolated network satellite 110 if the communications loss is extended or permanent. In some cases, the isolated and backed-up network satellite 110 may then be wiped of all data 10 or destroyed to maintain data security.

In some embodiments, communications satellites 120 may simultaneously track and radio frequency transmit and/or optically laser link (ISL) with other communications satellites 120 and one or more network satellites 110, and each network satellite 110 may simultaneously track and radio frequency transmit and/or optically laser link (ISL) with communications satellites 120 and one or more other network satellites 110, forming an autonomously reliable and redundant self-contained electronic data cloud communications and storage network 100. In some autonomous embodiments, the satellite network 100 may continue to operate without further command or control from any ground-based network control center. If a network control center is destroyed, damaged, disabled, or hacked, the satellite network 100 will continue functioning according to the most recently received authorized instruction. The satellite network 100 may adjust the most recently received authorized instruction according to changing parameters, such as communications losses, corrupted data storage sections, proximity detection, orbital adjustments, collision avoidance, and additional network satellite 110 additions without requiring specific instructions from the ground-based network control center.

Through the satellite cloud network 100, Earth observation information 10 from Earth observation satellites 140 anywhere in orbit may be privately and securely accessed by end-users from any region on the planet, making the observation recordings or measurements 10 available for transmission to any number of communications satellites 120 and network satellites 110 connected to the same satellite cloud network 100.

In one embodiment, the network satellites 110 orbit a planet 1 in a low planetary orbit. In a specific embodiment, 6 network satellites 110 orbit the planet 1 at a distance of approximately 500 miles (roughly 800 km) above the surface of the planet. This radius may be entirely inside of the inner Van Allen radiation belt, and be therefore shielded from most solar radiation. At this orbit, 6 network satellites 110 may be capable of forming a continuous communication loop or satellite cloud network 100 around the planet 1. Additional network satellites 110 may be added and incorporated after the initial continuous cloud network 100 is created to improve capabilities, throughput, and redundancy. In some versions of this embodiment around a planet with a larger radius, the 6 network satellites would be dispersed unevenly across the orbital plane to form a cloud network 100 even though the network satellites 110 do not form a complete communicative loop and some potential communicative links between adjacent network satellites 110 may be blocked by the curvature of the planet 1.

In another embodiment, 8 network satellites 110 orbit at an elevation of 500 miles (~800 km) above the surface of the planet 1, with two redundant network satellites 110 in a low power or idle mode. The 8 network satellites 110 transmit data and instructions 10 to and retrieve data and instructions 10 from geosynchronous communications satellites 120, and the geosynchronous communications satellites 120 in turn transmit data and instructions 10 to and retrieve data and instructions 10 from terrestrial access terminals 130 on the surface of the Earth 1. Other embodiments comprise a greater or lesser number of network satellites 110, which may include more or fewer active satellites and/or more or fewer redundant back-up satellites.

While the above implementations and aspects primarily discuss low-earth orbiting network satellites 110 and allowing access terminals 130 to communicate with the low-earth orbiting network satellites 110 through geostationary communications satellites 120, it is to be understood that a network 100 incorporating a different configuration of satellites could be configured without departing from the present application. Although some embodiments or aspects refers to geostationary or geosynchronous communications satellites or low earth orbit network satellites or storage satellites, it should be understood that those embodiments or aspects could additionally or instead incorporate satellites in alternate orbits (e.g., low earth orbit, middle earth orbit, equatorial orbit, polar orbit, inclined orbit, parallel orbits, elliptical orbits, . . . ). Additionally, in at least one embodiment, in place of the communications satellites, the network satellites, or the access terminals, some embodiments could incorporate sub-orbital elements 150 (not shown) such as antennae, aircraft, airborne, automobiles, balloons, blimps, dirigibles, drones, gliders, jets, kites, mobile devices, planetary stations, rigid airships, ships, space stations, spacecraft, stationary data centers, mesh network devices, or watercraft. These sub-orbital elements 150 (not shown) could function similarly to the satellite (110 or 120) or access terminal (130) equivalents, with adjustments to account for atmospheric operation, such as including elements to provide navigation, propulsion, or buoyancy. The sub-orbital elements 150 may communicate via radio frequency or laser link similar to the inter-satellite links used by satellites, and the sub-orbital element may communicate directly with access terminals 130, communications satellites 120, or network satellites 110. Such a satellite cloud network 100 could be configured to work in many configurations and with additional satellites without departing from the spirit of the present invention. Such a satellite cloud network 100 would provide similar benefit whether the access terminal 130 communicates directly with the network satellites 110 configured for data storage or communicates through intermediate communications satellites 120. In various embodiments, the satellite cloud network 100 could be configured to include more or fewer satellites, a greater or lesser orbital radius, more or fewer orbital planes, different types of satellites, multiple independent networks, alternative communication systems, additional sensors, or security measures.

In some embodiments, optimal imagery may be obtained by one or more earth observation satellite orbiting between 200 and 2000 kilometers (approximately 125-1250 miles) above the surface of the Earth. In some embodiments, the network satellites 110 optimally orbit between 700-900 kilometers (approximately 435-560 miles) above the surface of the Earth. In some embodiments, the earth observation satellites 140 may orbit at a lower orbit than the network satellites 110. In a specific embodiment, the earth observation satellite(s) 140 may orbit at less than 700 kilometers (approximately 425 miles) above the surface of the Earth, while network satellites 110 orbit at greater than 700 kilometers (approximately 435 miles) above the Earth. In a still more specific embodiment, the earth observation satellite(s) 140 may orbit at less than 500 kilometers (approximately 310 miles) above the surface of the Earth, while network satellites 110 orbit at greater than 700 kilometers (approximately 435 miles) above the Earth. In an even more specific embodiment, the earth observation satellite(s) 140 may orbit between 200-300 kilometers (approximately 125-186 miles) above the surface of the Earth, while network satellites 110 orbit at greater than 700 kilometers (approximately 435 miles) above the Earth.

In some embodiments, the satellite cloud network 100 may communicate with multiple earth observation satellites 140 that orbit at different heights from each other. In some embodiments, the satellite cloud network 100 may communicate with multiple earth observation satellites 140 that communicate in different frequencies from each other. In some embodiments, some network satellites 110a (a first subset of network satellites 110) are configured to communicate with some earth observation satellites 140a (a first subset of earth observation satellites 140) while some other network satellites 110b (a second subset of network satellites 110) are configured to communicate with some other earth observation satellites 140b (a second subset of earth observation satellites 140). In a variation of this embodiment, some network satellites 110c (a third subset of network satellites) may be configured to communicate with both subsets of earth observation satellites 140a and 140b.

In one embodiment, the satellite cloud network 100 includes enough network satellites 110 to maintain approximately 90% communication up-time between an earth observation satellite 140 and at least one of the network satellites 110. In this embodiment, the communication downtime may occur when the earth observation satellite orbits above one or both of the North and South poles.

In a specific embodiment, the satellite cloud network 100 may include at least 16 (sixteen) separate network satellites 110 occupying a single orbit. In this embodiment, the satellites may be separated by approximately 22.5 degrees (or approximately $\frac{1}{8}*\eta$ in radians) between each network satellite in the same orbit. As previously described, the satellite cloud network 100 may incorporate additional later-added network satellites 110 for expanded network up-time and bandwidth.

The foregoing description has described embodiments of an Earth Observation Satellite Information Routing System including earth observation satellites 140 and a satellite cloud network 100 of network satellites 110 and combinations thereof. It should be understood that Earth observation satellites are only one exemplary system for use with the communication of network satellites 110.

Although various aspects are herein disclosed in the context of certain preferred embodiments, implementations, and examples, it will be understood by those skilled in the art that the present invention extends beyond the specifically disclosed embodiments to other alternative embodiments and/or uses of the inventive aspects and obvious modifications and equivalents thereof. In addition, while a number of variations of the aspects have been noted, other modifications, which are within their scope, will be readily apparent to those of skill in the art based upon this disclosure. It should be also understood that the scope this disclosure includes the various combinations or sub-combinations of the specific features and aspects of the embodiments disclosed herein, such that the various features, modes of implementation and operation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this method of disclosure, is not to be interpreted as reflecting an intention that any claim require more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

What is claimed is:

1. An Earth Observation Satellite Information Routing System for relaying recordings from an Earth observation satellite through a geostationary communications satellite to a terrestrial ground station comprising:
   a plurality of low Earth orbit network satellites that are communicatively coupled to each other through a continuous loop of relays between consecutive network satellites, forming at least one continuous communication loop of satellites around the Earth;
   wherein a first network satellite (from the plurality of network satellites) is configured to receive a first recording from a first Earth observation satellite;
   wherein the first network satellite is configured to transmit the first recording directly to a second network satellite (from the plurality of network satellites);
   wherein the second network satellite is configured to transmit the first recording to a first geostationary communications satellite to be further transmitted to a terrestrial ground station;
   wherein the transmission of the first recording does not route through any terrestrial networks between the first Earth observation satellite and the terrestrial ground station.

2. The Earth Observation Satellite Information Routing System of claim 1, wherein the Earth observation satellite occupies a different orbital plane from the plurality of network satellites.

3. The Earth Observation Satellite Information Routing System of claim 2, wherein the orbital path of the network satellites does not orbit North of the Tropic of Cancer or South of the Tropic of Capricorn.

4. The Earth Observation Satellite Information Routing System of claim 2, wherein the network satellites orbit along an equatorial orbital path.

5. The Earth Observation Satellite Information Routing System of claim 4, wherein the Earth observation satellite orbits along a Polar orbital path.

6. The Earth Observation Satellite Information Routing System of claim 1, wherein the communicative link between the Earth observation satellite and the first network satellite comprises a laser communication link.

7. The Earth Observation Satellite Information Routing System of claim 1, wherein the continuous loop of relays between the first network satellite and the second network satellite comprises a laser communication link.

8. The Earth Observation Satellite Information Routing System of claim 1, wherein the connection from the terrestrial ground station through the plurality of network satellites to the Earth observation satellite enables the terrestrial ground station to maintain and monitor a live stream of the recording captured by the Earth observation satellite for at least 50% of the Earth observation satellite's orbit.

9. The Earth Observation Satellite Information Routing System of claim 1, wherein the connection from the terrestrial ground station through the plurality of network satellites to the Earth observation satellite enables the terrestrial ground station to maintain and monitor a live stream of the recording captured by the Earth observation satellite for at least 80% of the Earth observation satellite's orbit.

10. The Earth Observation Satellite Information Routing System of claim 1, wherein the terrestrial ground station can maintain a connection to a plurality of Earth observation satellites simultaneously through the plurality of network satellites.

11. An Earth Observation Satellite Information Routing System for relaying recordings from an Earth observation satellite through a geostationary communications satellite to a terrestrial ground station comprising:
   a first Earth observation satellite positioned in low earth orbit and configured to capture a first recording of some portion of the Earth;
   a plurality of low Earth orbit network satellites that are communicatively coupled to each other through a continuous loop of relays between consecutive network satellites, forming at least one continuous communication loop of satellites around the Earth; and
   a first geostationary communications satellite;
   wherein the first Earth observation satellite occupies a different orbital plane from the plurality of network satellites;
   wherein a first network satellite (from the plurality of network satellites) is configured to receive the first recording from the first Earth observation satellite;
   wherein the first network satellite is configured to transmit the first recording directly to a second network satellite (from the plurality of network satellites);
   wherein the second network satellite is configured to transmit the first recording to the first geostationary communications satellite;
   wherein the first geostationary communications satellite is configured to transmit the first recording to a terrestrial ground station;
   wherein the transmission of the first recording does not route through any terrestrial networks between the first Earth observation satellite and the terrestrial ground station.

12. The Earth Observation Satellite Information Routing System of claim 11, wherein the connection from the terrestrial ground station through the plurality of communicatively linked network satellites to the Earth observation satellite enables the terrestrial ground station to maintain and monitor a live stream of the recording captured by the Earth observation satellite for at least 50% of the Earth observation satellite's orbit.

13. The Earth Observation Satellite Information Routing System of claim 11, wherein the Earth observation satellite occupies a different orbital plane from the plurality of network satellites.

14. The Earth Observation Satellite Information Routing System of claim 11, wherein the network satellites orbit along an equatorial orbital path and the Earth observation satellite orbit along a Polar orbital path.

15. The Earth Observation Satellite Information Routing System of claim 11, wherein the first geostationary communications satellite will only transmit the first recording to a terrestrial ground station that is physically located within a pre-designated approved terrestrial jurisdiction.

16. The Earth Observation Satellite Information Routing System of claim 1, wherein the first recording may only be transmitted to a terrestrial ground station that is physically located within a pre-designated approved terrestrial jurisdiction.

17. The Earth Observation Satellite Information Routing System of claim 1, wherein the transmission of the first recording does not route through any terrestrial networks between the first Earth observation satellite and the terrestrial ground station.

18. An Earth Observation Satellite Information Routing System for relaying recordings from an Earth observation satellite through a geostationary communications satellite to a terrestrial ground station comprising:
   a plurality of low Earth orbit network satellites that are communicatively coupled to each other through a continuous loop of relays between consecutive network satellites, forming at least one continuous communication loop of satellites around the Earth; and
   wherein a first network satellite (from the plurality of network satellites) is configured to receive a first recording from a first Earth observation satellite;
   wherein the first network satellite is configured to transmit the first recording directly to a second network satellite (from the plurality of communicatively linked network satellites);
   wherein the second network satellite is configured to transmit the first recording to a first geostationary communications satellite;
   wherein the first geostationary communications satellite is configured to only transmit the first recording only to a terrestrial ground station that is physically located within a pre-designated approved terrestrial jurisdiction;
   wherein the transmission of the first recording between the first Earth observation satellite and the terrestrial ground station does not route through any outside terrestrial networks.

19. The Earth Observation Satellite Information Routing System of claim 18, wherein the connection from the terrestrial ground station through the plurality of network satellites to the Earth observation satellite enables the terrestrial ground station to maintain and monitor a live stream of the recording captured by the Earth observation satellite for at least 50% of the Earth observation satellite's orbit.

20. The Earth Observation Satellite Information Routing System of claim 18, wherein the network satellites orbit along an equatorial orbital path and the Earth observation satellite orbit along a Polar orbital path.

* * * * *